(12) United States Patent
Todd et al.

(10) Patent No.: US 7,702,303 B2
(45) Date of Patent: Apr. 20, 2010

(54) POWER MANAGEMENT IN A WLAN INFRASTRUCTURE

(75) Inventors: Terence Douglas Todd, Hamilton (CA); Amir Antoun Renne Sayegh, Hamilton (CA); Enrique J. Vargas, Ottawa (CA)

(73) Assignee: McMaster University, Hamilton, Ontario (CA)

( * ) Notice: Subject to any disclaimer, the term of this patent is extended or adjusted under 35 U.S.C. 154(b) by 868 days.

(21) Appl. No.: 11/424,927

(22) Filed: Jun. 19, 2006

(65) Prior Publication Data
US 2007/0291732 A1 Dec. 20, 2007

(51) Int. Cl.
*H04B 1/16* (2006.01)
(52) U.S. Cl. ............. 455/127.5; 455/426.2; 455/552.1; 370/338; 370/343.2; 370/347; 370/351
(58) Field of Classification Search ............. 455/127.5, 455/426.2, 552.1; 370/338, 343.2, 347, 351
See application file for complete search history.

(56) References Cited

U.S. PATENT DOCUMENTS

| | | | | |
|---|---|---|---|---|
| 2004/0259542 A1* | 12/2004 | Viitamaki et al. | ........ | 455/426.2 |
| 2005/0020299 A1* | 1/2005 | Malone et al. | ........... | 455/552.1 |
| 2005/0152324 A1* | 7/2005 | Benveniste | .................. | 370/338 |
| 2007/0110009 A1* | 5/2007 | Bachmann et al. | ........... | 370/338 |
| 2007/0160027 A1* | 7/2007 | Muqattash et al. | ........... | 370/347 |
| 2007/0207750 A1* | 9/2007 | Brown et al. | ............. | 455/127.5 |
| 2007/0238438 A1* | 10/2007 | Alon et al. | ................ | 455/343.2 |
| 2007/0291732 A1* | 12/2007 | Todd et al. | ................... | 370/351 |

OTHER PUBLICATIONS

Velayos, Hector, et al., "Load Balancing in overlapping wireless LAN cells", Published in Proceedings of IEEE ICC 2004, Paris, France, Jun. 2004.
Matar, G., First Office Action for CA 2583206, Sep. 29, 2009.

* cited by examiner

*Primary Examiner*—William D Cumming
(74) *Attorney, Agent, or Firm*—Integral Intellectual Property Inc.; Miriam Paton (57) ABSTRACT

A wireless local area network includes multiple access points with overlapping coverage, and modes of different power consumption are available to the access points. It is assessed whether the traffic load of the network may be adequately supported using fewer access points in an active mode. If so, the traffic load is redistributed from certain active access points among the remaining access points in the active mode. The certain access points are switched into a mode of lower power consumption than the active mode. Similarly, it is assessed whether the traffic load of the network is adequately supported by the current number of access points in an active mode. If not, certain access points which are in a mode of lower power consumption are switched to the active mode. The traffic load is redistributed among the access points in the active mode including the certain access points.

20 Claims, 7 Drawing Sheets

POWER MANAGEMENT IN A WLAN INFRASTRUCTURE

COPYRIGHT NOTICE

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyright rights whatsoever.

BACKGROUND

Wireless local area networks (WLANs) are increasingly available for accessing the Internet and for telephony applications such as Voice over Internet Protocol (VoIP) applications. The IEEE standard 802.11 is a widely adhered-to standard specifying architecture and protocols for WLAN operation. In a typical WLAN deployment using the IEEE 802.11 standard, a set of access points (AP) are connected to a common backbone called a distribution system. The distribution system serves to transfer data between the access points, or from an access point to an external network such as the internet via a gateway. Each access point is the master device in a Basic Service Set (BSS) subnet of wireless stations (STA), and serves to relay data between these stations, and between each of these stations and the distribution system.

When the capacity of a single AP does not meet the required network traffic load in a planned coverage area (i.e., hotspot), multiple APs operating on different channels may be installed with overlapping coverage. The use of multiple APs with overlapping coverage also improves the reliability of the network, due to the inherent redundancy of such a scheme in the case of a single failed AP.

If the intended coverage area is outdoors, there arises the problem of how to provide the APs with power, which is traditionally supplied over a wired connection in an indoor environment. As more widespread deployment of WLANs in an outdoor environment occurs, the problem of managing power to the APs becomes more critical. Solar-panel powered wireless APs called solar nodes (SN) are commercially available. These allow the outdoor deployment of WLANs, even in areas where no traditional source of power for the network is available. The size of solar panel and battery required to provide adequate power is a key driver of cost for the SN. Managing power in such a WLAN is crucial in order to conserve battery power in the SNs, and also to minimize the size of solar panel required to power each of the SNs.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

When the capacity of a single AP is not sufficient to handle the desired load in a coverage area, multiple APs operating on different channels may be installed with overlapping coverage. When the intended coverage area is outdoors, the APs may be solar-powered. Solar nodes (SN) are APs that are equipped with batteries that can be recharged using solar energy. A method for managing the power consumption by the SNs in a network with SNs is highly desirable in order to increase their battery lifetimes and to decrease their hardware requirements for solar panel size and battery capacity. Such a method is equally applicable to any other type of battery-powered AP and also to any other AP where power conservation is of concern.

SNs are able to operate in multiple modes, which have different levels of power consumption. When the SNs are not processing network traffic, they are able to transition to a lower power consumption mode, allowing them to conserve battery power. If an SN is not needed to support the immediate traffic load in the network, it is therefore preferable for it to be in a low power-consumption mode. A method for determining when the individual SNs should switch from low-power to active (higher-power) modes or vice versa may be used to manage the power of the SNs in the network. Such a method may be implemented using a centralized server that monitors the network load conditions and SN battery states. However, another approach is to use a distributed method wherein each SN is able to independently make decisions about when to switch modes according to the current network conditions. Constraints may be built into such a method to ensure that SNs are not being switched frequently between modes, and that STAs are not transferred back and forth between APs unnecessarily, resulting in delays and/or service disruptions.

In a distributed method, each SN is able to make a decision about when it is appropriate to switch into TDLE mode, which is a low power-consumption mode defined hereinbelow. To enable this decision, a communication protocol may be defined to exchange current state information among all the SNs. This information may include each SN's current values for parameters such as: traffic load, battery-capacity level, estimated lifetime, service mode (i.e., low-power, or higher power), number of associated STAs, disassociated STAs, and the like. For example, a period of time may be defined, during which each SN may measure the current value of these parameters in order to characterize its own current state, and at the end of which time, the SN may broadcast to all the other SNs in the network the current values of its state parameters. In this way, each SN is able to assess the average network utilization, and also how its own utilization and battery capacity compare to the other SNs in the network.

To further improve the efficiency of the network, a load balancing scheme may be incorporated into such a distributed power management algorithm. When a SN switches from an active mode into a low-power mode, its traffic must be transferred to the remaining active SNs. A load balancing algorithm may be used to more equally distribute the load among the remaining SNs. Moreover, if the load in a network is unbalanced, i.e. too many STAs are connected to a single SN while other SNs are underutilized, transmission delays causing interrupted connectivity or other unacceptable quality issues may result. Load balancing methods have been presented previously, and proprietary commercial solutions are available. These methods typically hand off excess STAs from overloaded APs to other APs that have additional capacity. The better methods are able to balance the load over multiple APs without causing a large number of unnecessary hand-offs.

Figure 1:
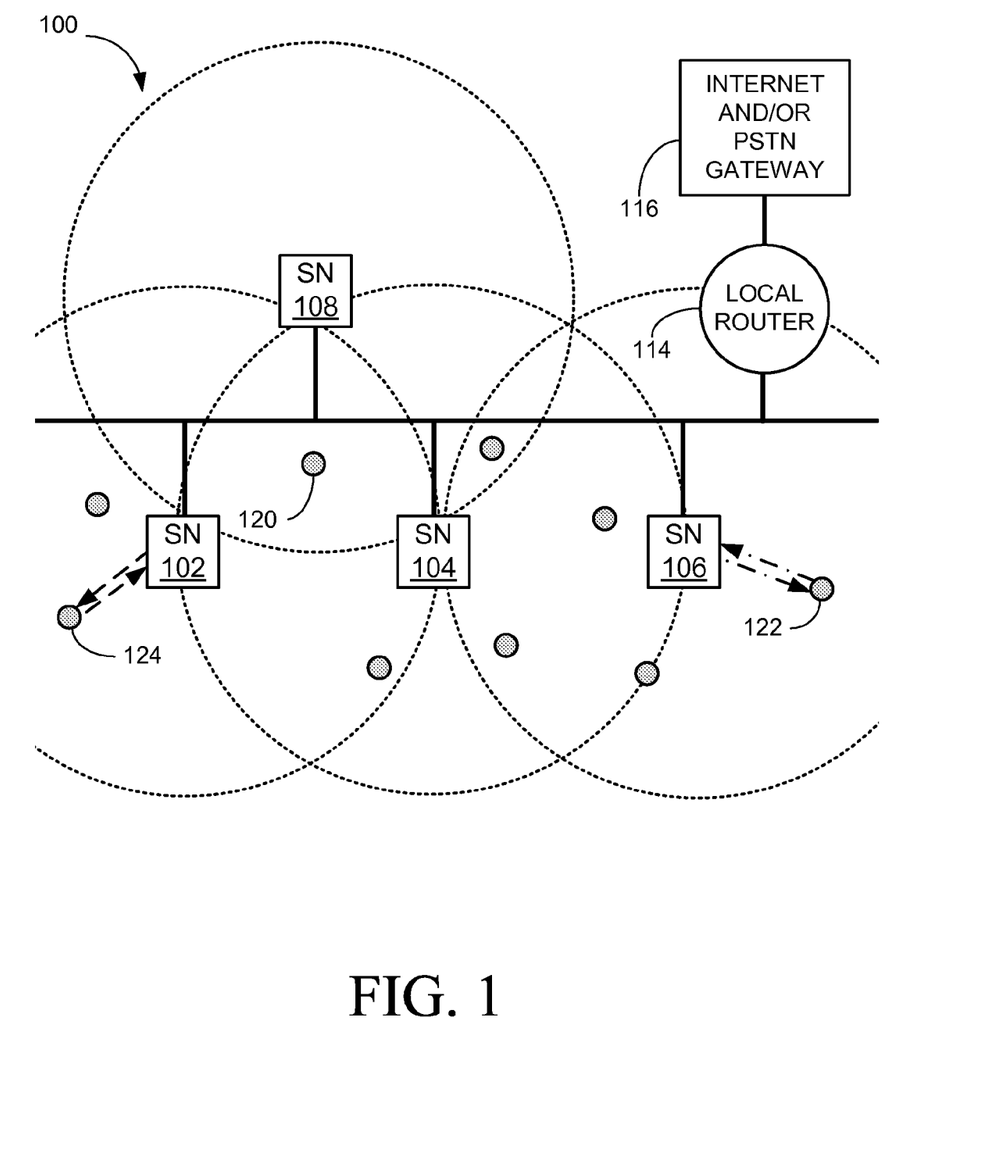
FIG. 1 is a schematic of an exemplary WLAN system that is compatible with a power management scheme.

FIG. 1 is a schematic of an exemplary WLAN system 100 that may be compatible with a power management method. In this system, SNs 102, 104, 106, and 108 provide coverage to mobile STAs such as STAs 120, 122, 124 in an overlapping scheme. For example, STA 120 may connect to any of SNs 102, 104, or 108 while at the location shown in FIG. 1. The choice of which SN to connect to may depend on criteria such as the number of other STAs already connected to each of the SNs and their combined network usage, and the current battery reserve power of each SN. A distributed scheme where each SN has the authority to make decisions about whether or not to allow a STA to connect may be used to balance the load among all the SNs. In FIG. 1, the SNs are shown connected to a distribution system, which also comprises a local router 114, and a gateway to the internet 116. For an outdoor installation, the SNs may connect to the distribution system using wireless communication interfaces and protocols such as are described in the IEEE 802.11 family of standards.

A wireless network may be compatible with IEEE standard 802.11e, which supports video and VoIP traffic as well as Best Effort traffic. In the following discussion, a superframe is assumed to span a single beacon period. However, it will be obvious to one of ordinary skill in the art to modify the following discussion for superframes that span multiple beacon periods. In the IEEE 802.11e standard, the time between beacons (i.e., a superframe) may be divided into a Connection Oriented (CO) period serviced using HCCA (hybrid-coordinated controlled channel access), and a BE period serviced using EDCA (enhanced distributed channel access). The standard specifies that there may be more than one HCCA and the EDCA period per superframe, and that these may start at any point in the superframe depending on the SN's decision. Therefore, the duration of the CO period and the BE period may be defined as the summation of the HCCA periods and EDCA periods respectively over an inter-beacon interval.

Figure 2:
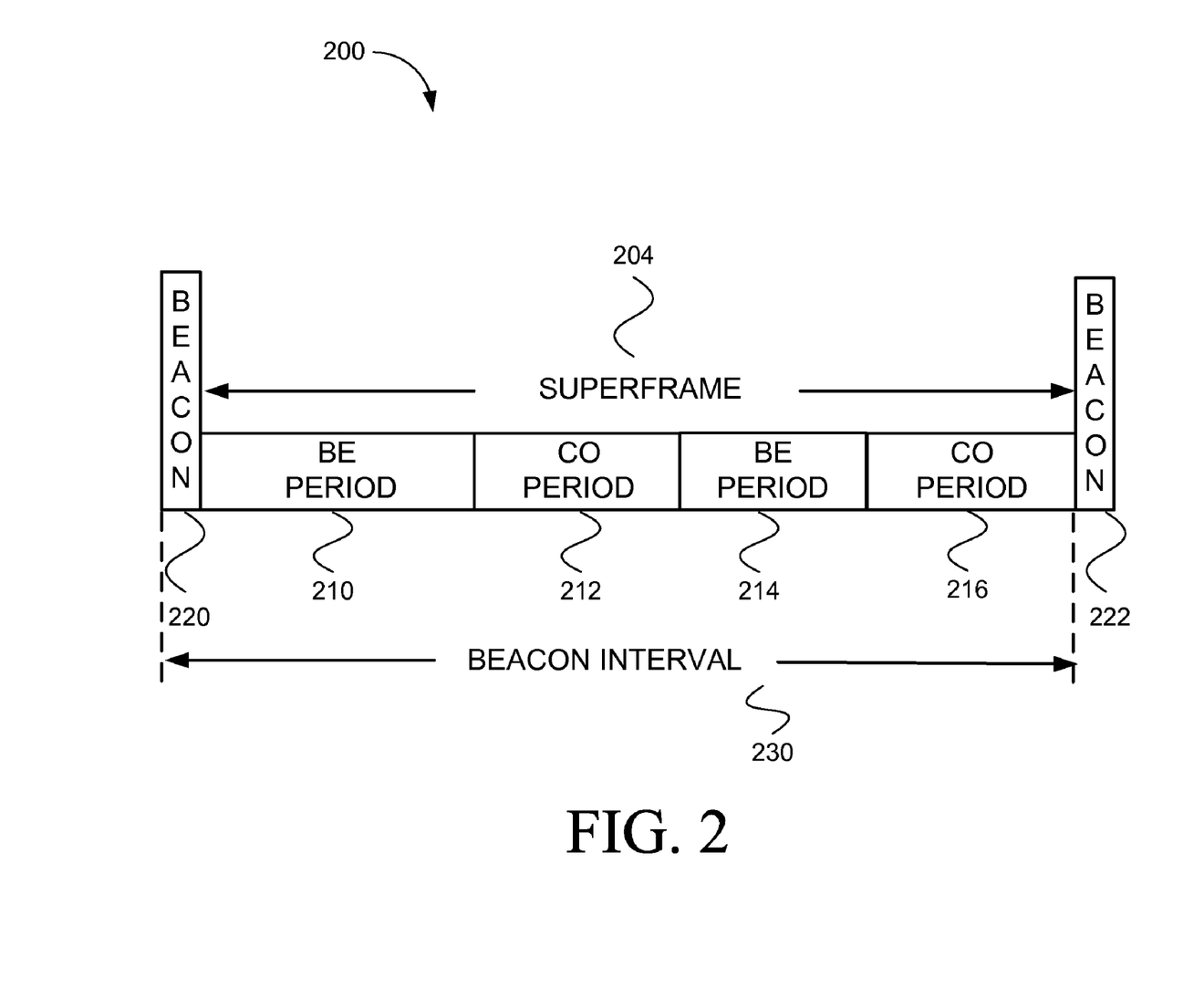
FIG. 2 is a schematic diagram showing an exemplary time period in a datastream that is compatible with IEEE standard 802.11e and is comprised of both Connection-Oriented (CO) and Best Effort (BE) traffic.

FIG. 2 shows a time period 200 in a datastream compatible with IEEE standard 802.11e. The time period is comprised of beacons 220 and 222, BE periods 210, 214, and CO periods 212, 216. The time between beacons is referred to either as the superframe 204. Beacon 220 and superframe 204 together comprise the beacon interval 230. The BE periods 210 and 214 together comprise the BE (EDCA) period. The CO periods 212 and 216 together comprise the CO (HCCA) period.

Many different embodiments of a combined power management and load balancing scheme may be defined. We describe here two exemplary methods that are compatible with a WLAN comprising APs arranged in an overlapping format, such as the example shown in FIG. 1. Although these methods are described in the context of the IEEE 802.11 family of standards, they can readily be extended to other WLAN standards by one who is skilled in the art. The first method is useful only in the context of Best Effort (BE) traffic. The second method is also compatible with the IEEE 802.11e standard, which supports both BE traffic and real-time traffic such as streamed video and voice data.

In the following exemplary methods, we consider only two power management modes, namely IDLE and ACTIVE. However, these methods may be modified in a straightforward manner by one who is skilled in the art to handle more than two power management modes of varying degrees of power consumption. A SN may go into a low power-consumption mode called IDLE mode (also known as SLEEP or DOZE mode) when it is not required to support the network load. It is also desirable for an SN that is low on battery power to go into IDLE mode to conserve power while recharging, during which time the load is redistributed among the other SNs with higher battery reserves. In IDLE mode, the SN has its radios and dispensable circuits switched off for much of the time, thus minimizing its power consumption, awakening periodically to send/receive messages. In ACTIVE mode, the SN is actively participating in the network traffic by transmitting, receiving and listening using its radios, and is consuming more power than when in IDLE mode.

First, we define some relevant parameters that will be used in the descriptions of both exemplary methods:

$T_{beacon}$: Time interval from the start of a beacon to the start of the next beacon transmitted from the same SN, for example beacon interval 230 in FIG. 2.

$T_W$: Time interval during which SNs do not change mode. At the end of each of these time intervals, SNs may be switched from ACTIVE to IDLE or vice versa as the traffic load requires. The longer this interval, the less reactive the system is to traffic load fluctuations. $T_W$ may be equal to $T_{beacon}$, or may be several times longer.

$T_{CO}$: Summation of the HCCA periods in a superframe, i.e., the total amount of time in the superframe used for CO traffic.

$T_{BE}$: Summation of the EDCA periods in a superframe. It is the complement of $T_{CO}$, representing the time available for BE traffic.

$U_{CO}$: CO channel utilization of an SN during the HCCA periods, normalized to $T_{CO}$. This quantity is dimensionless, and represents the fraction of the total possible time in a superframe that may be used for CO traffic that is actually being used.

$U_{BE}$: Fractional BE channel utilization of an SN during the EDCA periods, normalized to $T_{BE}$.

$U_{BEmax}$: Maximum allowable BE channel utilization of an SN during the EDCA periods, normalized to $T_{BE}$.

$t_{BE}^k$: Time in the BE period during which the STA k has been utilizing the medium to transmit/receive data.

$t_{CO}^k$: Time in the CO period during which the STA k has been utilizing the medium to transmit/receive data.

E: Battery-capacity level

ΔE: Difference between the lowest E of any ACTIVE SN, denoted $\min(E_{ACTIVE})$ and the highest E of any IDLE SN, denoted $\max(E_{IDLE})$.

1. Persistent Load Balancing and Awakening/Sleeping Algorithm (PLAS)

A first exemplary power management method for a network with solar nodes incorporates a load balancing method by Velayos et al., "Load Balancing in Overlapping Wireless LAN Cells.", *Paper B of Ph.D. thesis titled "Autonomic Wireless Networking"*, (published by the Laboratory for Communication Networks, Department of Signals, Sensors and Systems, KTH Royal Institute of Technology, Stockholm, Sweden). This paper (pages 43-54 of the thesis) is hereby incorporated by reference. In this first method, the IEEE standard 802.11e is not supported. Only Best Effort traffic is considered, i.e. $T_{CO}=0$.

Velayos et al. describe a method that features "a completely distributed architecture based on agents running at each AP. These agents send and receive load information . . . and select the stations that must hand off to balance the load" (p. 46, para. 3). This method does not require any centralized control, but rather invests each of the agents running on the APs with the decision-making power to either hand off a STA or take on a new STA to achieve a more balanced end-state.

In Velayos' method, a Load Balancing Agent (LBA) is introduced into each AP:

(p. 48, para. 1) "Each LBA periodically broadcasts the load level of its AP to [the other APs] . . . . Using the reports from other LBAs, each LBA assesses whether the load is balanced among neighboring APs. If it is not balanced, it determines its AP state with respect to load sharing. There are three possible states: overloaded, underloaded or balanced. Under-loaded APs are willing to accept new stations either roaming from neighboring APs or entering the network. Balanced APs only accept new stations joining the network. Overloaded APs do not accept additional stations and force the handover of current stations to reduce its load level."

(p. 48, para. 3-5; p. 49, para 1-3) "The load metric is one of the key elements in a load balancing system . . . . We use the throughput per AP, including uplink and downlink traffic, in bytes per second as the load metric. This is an adequate metric for our scenario because it is based on the traffic level and the AP can compute it without assistance from the stations.

Another important element in a load balancing system is the function used to measure the balance of the system. Comparing the throughput at different APs is not feasible because the varying nature of the traffic generated by the stations will always make these values different. Instead, we use the balance index, β . . . :

$$\beta \equiv \frac{(\sum B_i)^2}{(n \sum B_i^2)}$$

where [$B_i$ is the throughput at the ith AP, and] n is the number of neighboring APs over which the load is being distributed. The balance index is 1 when all AP have the same throughput and tends to 1/n when the throughput is severely unbalanced. The target for the load-balancing algorithm is to maximize the balance index.

The balance index quantifies the balance among neighboring APs, but it is not used to determine the APs state among overloaded, underloaded or balanced. For this matter, the load at each AP is compared with the average load L calculated as follows:

$$L = \frac{\sum B_i}{n}$$

To determine L, every active $AP_i$ measures its own through-put $B_i$ over the period of time between beacons, and then broadcasts it to its neighbors. In this way, all APs know the throughput of the other APs and are able to determine L, and thus their own relative load state.

The APs with load below L are declared under-loaded and thus can accommodate more traffic. The APs with load above L are divided into two groups: overloaded and balanced. Overloaded APs are those which load exceeds the average by δ, while balanced APs are those which load exceeds the average by less than δ. The rationale behind the parameter δ is to force the transfer of load from the most overloaded APs to those with load below the average L. The APs that are slightly over the average should not receive more load . . . .

The parameter δ reduces the number of load transfers, but it also permits some unbalance since only APs exceeding the average load by δ will transfer some load.

Another important aspect of a load-balancing scheme is the policy to select the station that will be transferred from an overloaded AP. The simplest policy is random selection. But it tends to produce many transfer decisions until the load is balanced. Instead, we have created a new policy called the best candidate aimed at reducing the number of transferred stations. The best candidate policy selects the stations which throughput is closest to the difference between the average load and the load at the AP.

Finally, we have designed a mechanism to transfer a station from an overloaded AP to an under-loaded one . . . . First, the overloaded AP terminates the association of the station that should hand off by sending the standardized signaling message called disassociation notification. Second, the station searches and re-associates with another AP. If the station tries to re-associate with an overloaded or balanced AP, they will reject the request. Only under-loaded APs will accept the station. The drawback of this mechanism is that the station may need to try several APs until an under-loaded one is found."

Figure 3:
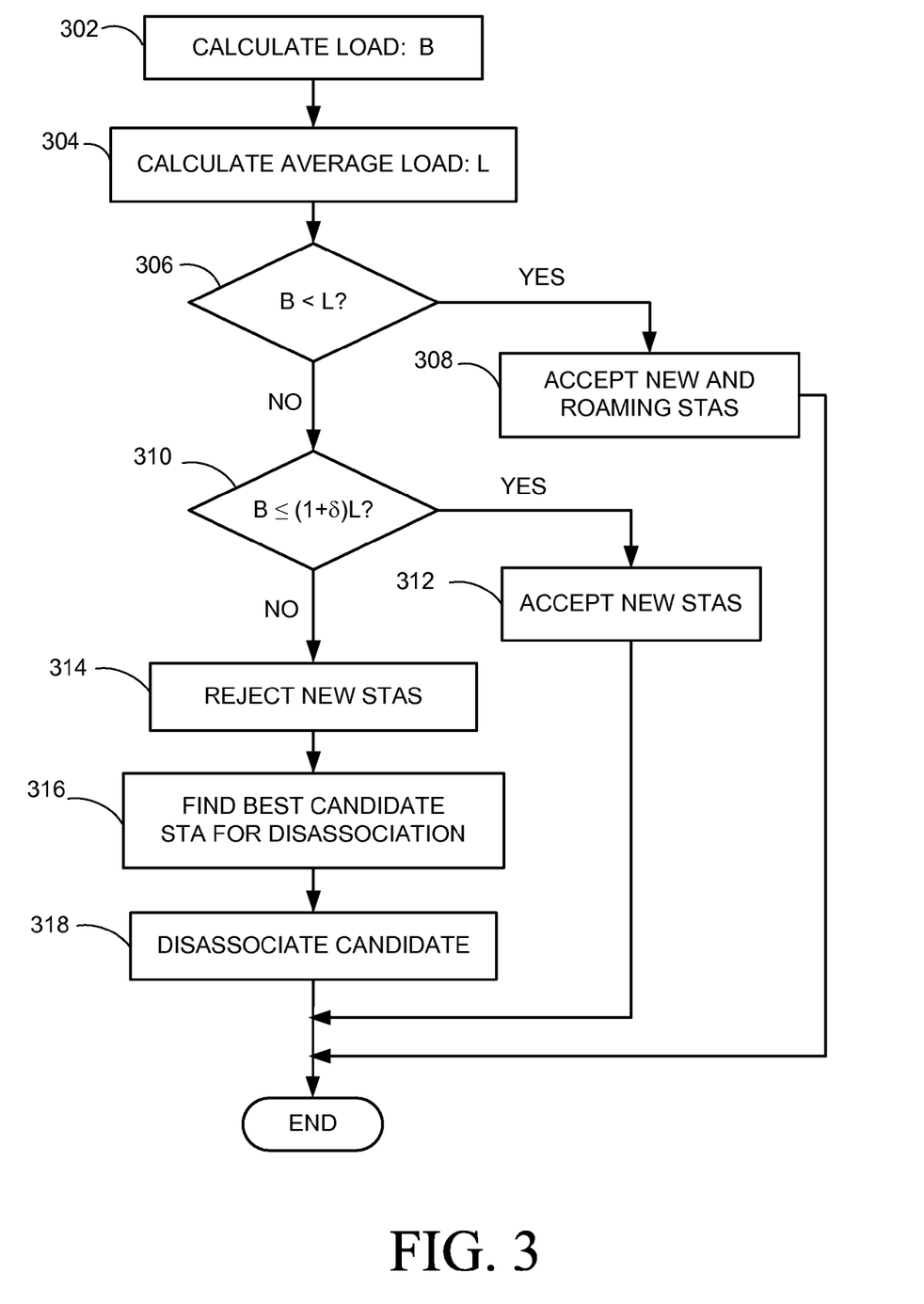
FIG. 3 is a flowchart of an exemplary prior art method for load balancing, compatible with the WLAN system of FIG. 1.

Velayos' method implemented in the context of an SN (e.g SN 102 in FIG. 1) is illustrated in a flowchart in FIG. 3. This method repeats every $T_{beacon}$. At 302, SN 102 calculates its own load, B. At 304, SN 102 calculates the average load, L, for all the active SNs using the latest data it has received from them. At 306, SN 102 tests whether its own load B is less than L. If the test is passed, this means that SN 102 is under-loaded, and at 308, it can accept new and/or roaming STAs. If not, then at 310, SN 102 tests whether its own load B is in the range $L \leq B \leq (1+\delta)L$. If the test is passed, this means that SN 102 is balanced and may accept new STAs at 312. If neither test is passed, this means that $B > (1+\delta)L$, and that SN 102 is overloaded. In this case, SN 102 will, at 314, reject any new STAs seeking to associate with it. At 316, SN 102 will select from among its associated STAs the best candidate for disassociation, for example, the STA whose throughput is closest to the difference (L-B). At 318, SN 102 will disassociate the selected STA.

Velayos' algorithm may be combined with a power management scheme that seeks to maximize the lifetime of the SNs. To accomplish this, Velayo's algorithm may be extended to handle ACTIVE and IDLE states. Every $T_W$ period of time, all SNs, whether ACTIVE or IDLE, calculate the average utilization over all the active SNs, defined as:

$$\overline{U_{BE}} = \frac{\sum U_{BE}^i}{N_{ACTIVE}} \quad (1)$$

where the summation is over all active SNs. If the average utilization is larger than the maximum allowable utilization, i.e., $\overline{U_{BE}} > U_{BE\ max}$, then an additional active SN is needed to support some of the traffic. A SN may be selected from among the group of SNs currently in IDLE mode. For example, the member of that group having the highest battery-capacity level may be selected. The selected IDLE SN is then changed from IDLE mode to ACTIVE mode. If there are no available SNs in IDLE mode that can wake up, the network must continue to operate at a level exceeding $U_{BE\ max}$.

On the other hand, if the average fractional utilization is less than the maximum allowable utilization, i.e. $\overline{U_{BE}} < U_{BE\ max}$, it may be possible to switch one of the ACTIVE SNs into IDLE mode. To evaluate taking this action, the ACTIVE SN with the lowest battery-capacity level has to first estimate $\overline{U_{BE}}'$ over ($N_{ACTIVE}-1$) SNs instead of $N_{ACTIVE}$ SNs. If $\overline{U_{BE}}' \leq U_{BE\ max}H$, then this SN disassociates all its STAs and switches to IDLE mode. The factor H provides a margin to the wakeup/IDLE criteria, and avoids putting an SN into IDLE mode and then waking it up for short periods of time which leads to many unnecessary handovers.

Figure 4:
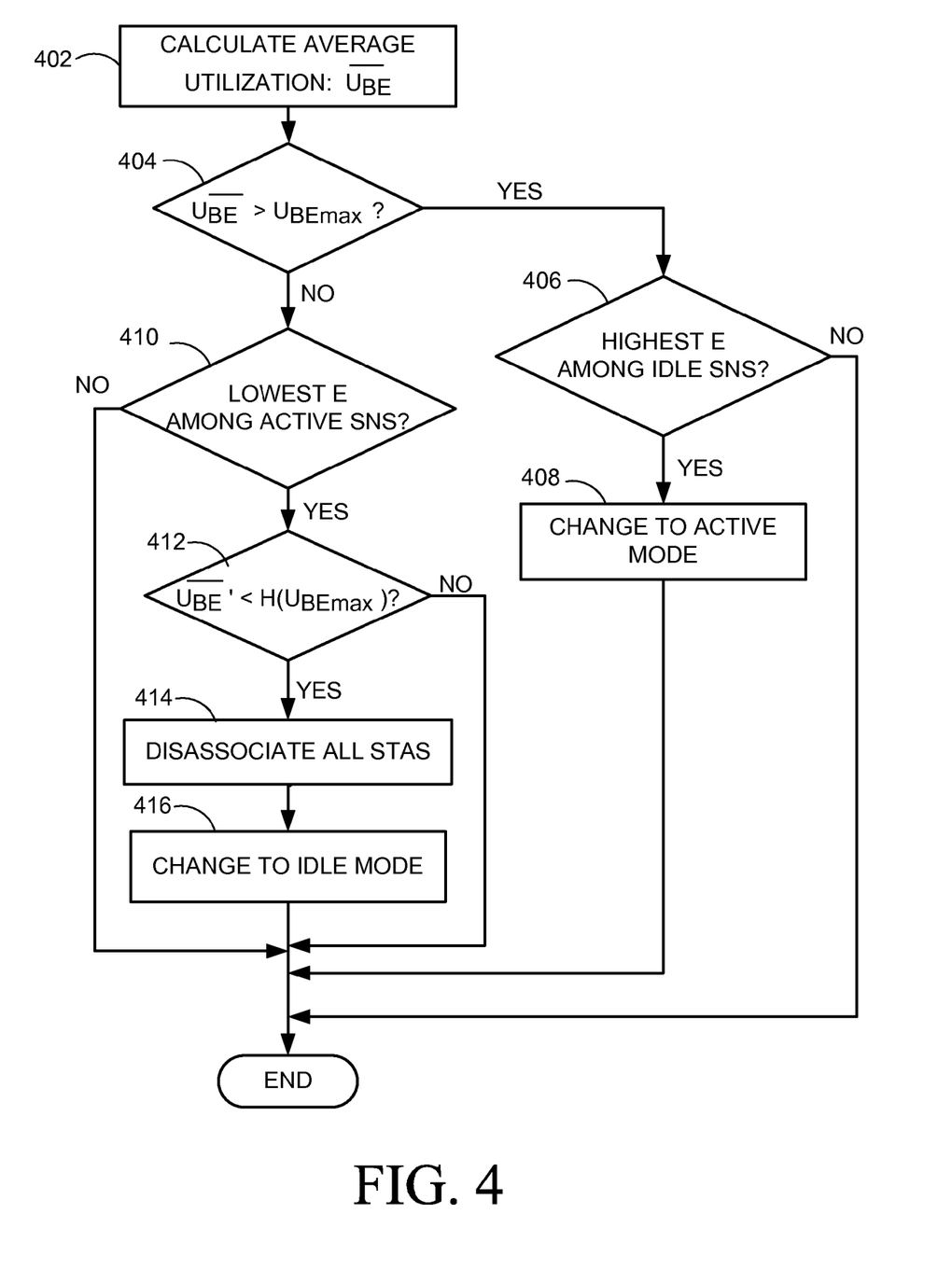
FIG. 4 is a flowchart of an exemplary method for power management, compatible with the WLAN system of FIG. 1 and with the prior art load balancing method of FIG. 3.

FIG. 4 is a flowchart illustrating this power-management method in SN 102. This method repeats every $T_W$ period. At 402, SN 102 calculates the average utilization for all the active SNs, using the latest broadcast information received. At 404, SN 102 tests whether the average utilization exceeds the maximum allowable utilization. If this test is passed, then, at 406, SN 102 tests whether it is: (1) IDLE, and (2) the SN with the highest battery-capacity level of all the IDLE SNs. If both conditions are met, then, at 408, SN 102 switches itself into ACTIVE mode. If, at 404, the average utilization is less than the maximum allowable utilization, then at 410, SN 102 tests whether it is: (1) ACTIVE, and (2) the SN with the lowest battery-capacity level of all the ACTIVE SNs. If both these conditions are met, then at 412, SN 102 calculates what the average utilization would be in the case of having one less active SN, and if this new average utilization is smaller than the allowable maximum by a margin determined by H, then at 414, SN 102 disassociates all its STAs, and at 416, it switches to IDLE mode.

When the network has been operating for a long time, one of the ACTIVE SNs may have the lowest battery-capacity level. Therefore, it would be better to switch this SN into IDLE mode, and wake up one of the IDLE SNs that has higher battery-capacity level. To evaluate a candidate SN for awakening, we use the parameter $\Delta E$. When the difference between E for the lowest ACTIVE SN and the highest SN in IDLE mode is greater than $\Delta E_{max}$, then both SNs may switch their service modes. The ACTIVE SN disassociates all its STAs and changes to IDLE mode as soon as it detects that the previously IDLE SN is awake. This procedure is executed periodically every $T_{switch}$ time units and aims to maintain similar battery-capacity levels on all the SNs. This method is illustrated in a flowchart in FIG. 5.

Figure 5:
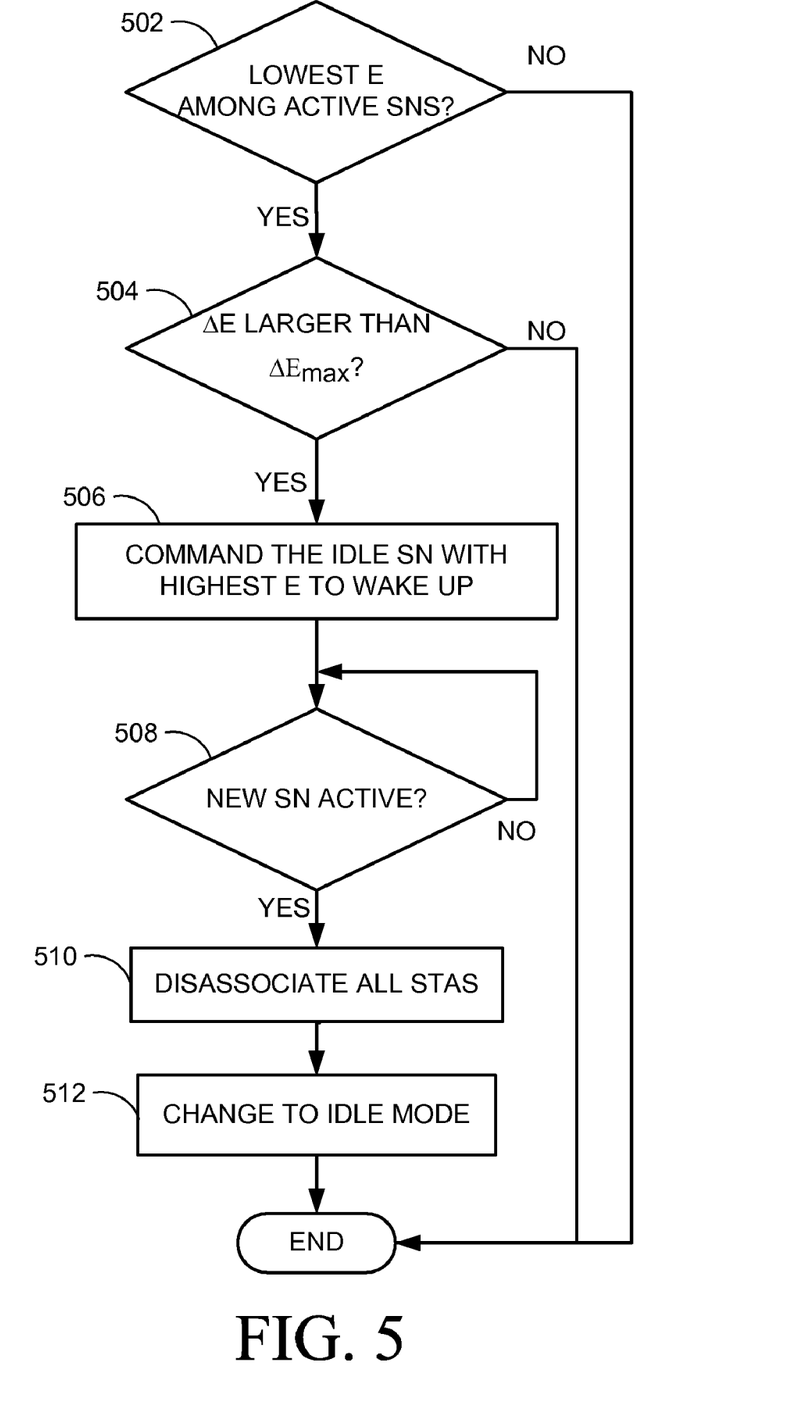
FIG. 5 is a flowchart of a second exemplary method for power management, compatible with the WLAN system shown of FIG. 1, the prior art method of FIG. 3 and the power management method of FIG. 4.

At 502, SN 102 tests whether it is: (1) ACTIVE, and (2) the SN with the lowest battery-capacity level of all the ACTIVE SNs. If both these conditions are met, then at 504, SN 102 calculates whether $\Delta E$ is larger than the maximum allowable value. If it is, then at 506, SN 102 commands the IDLE SN with the highest battery-capacity level to switch to ACTIVE mode. At 508, after the commanded SN has switched to ACTIVE mode, SN 102 at 510 disassociates all its STAs and at 512 switches itself into IDLE mode.

Figure 6:
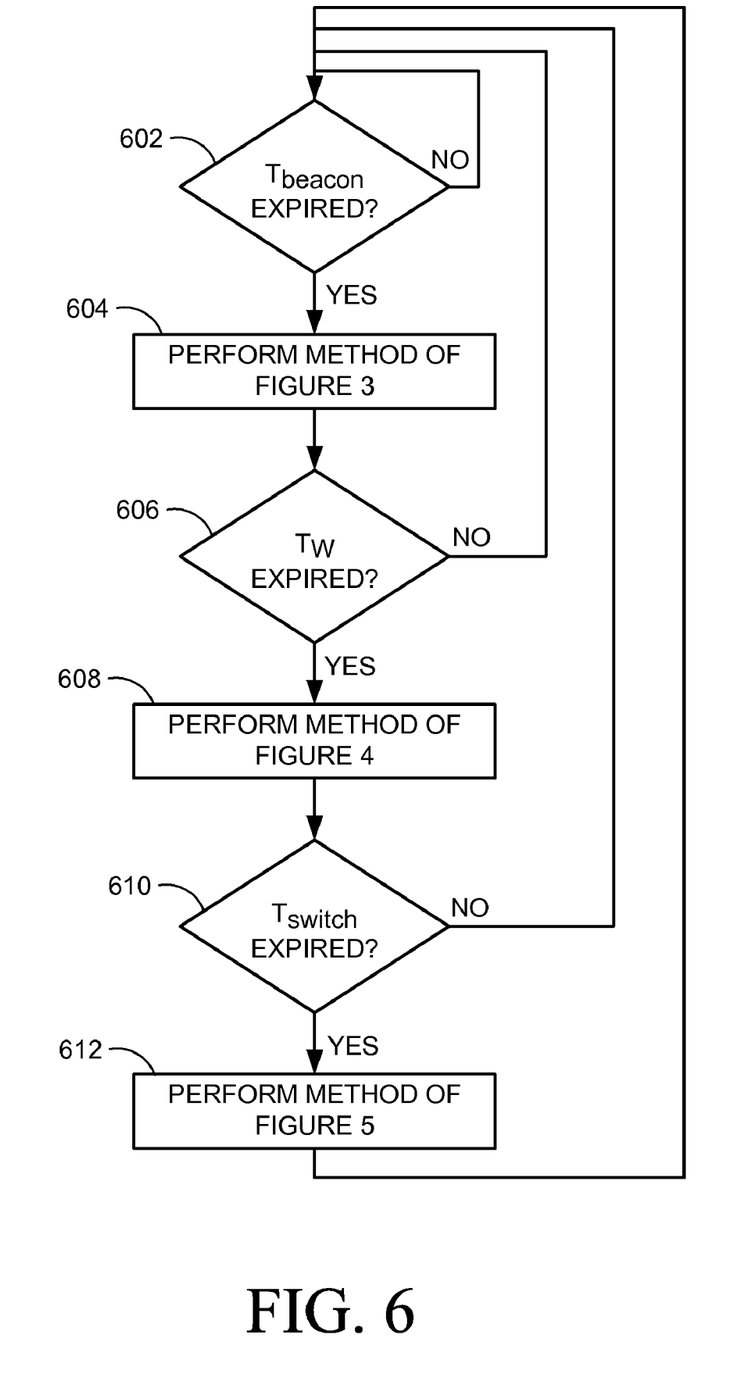
FIG. 6 is a flowchart showing an exemplary power management method comprising the methods of FIGS. 3, 4 and 5.

The methods of FIG. 3, 4 and 5 may be combined as shown in FIG. 6. At 602 and 604, the method of FIG. 3 repeats with periodicity $T_{beacon}$. At 606 and 608, the method of FIG. 4 repeats with periodicity $T_W$, and at 610 and 612, the method of FIG. 5 repeats with periodicity $T_{switch}$. Typically, $T_{beacon}$ is the shortest of the three time constants, with the method of FIG. 3 repeating approximately every 100 ms. $T_W$ should be short enough to be responsive to traffic requests, and may be typically set longer than $T_{beacon}$ and may be in the range of 1-3 seconds. $T_{switch}$ governs the process of switching SNs into IDLE mode to recharge batteries, and may be orders of magnitude larger than $T_{beacon}$, and $T_W$.

When disassociating a STA, a SN may follow the procedures defined by the IEEE 802.11 family of standards. As a first step, a SN sends one of its associated STAs a disassociation notification. The STA is not allowed to refuse the notification, and disassociates itself from the SN. The newly disassociated STA then seeks to establish a connection with a new SN.

Although not compatible with current IEEE 802.11 standards, a possible method for transferring STAs would be to include a preceding step where an SN notifies its peers that it will disassociate a STA, and that the STA will be roaming to a new SN. The new SN will then know the identity of the STA before being contacted by it. A further enhancement would be to provide the STA that is being disassociated with a list of SNs that could support their traffic demands. Since the SN that is issuing the disassociation message knows which SNs have available capacity, it might transmit this information to the STA along with the disassociation notification.

A pseudo-code description of the entire PLAS algorithm follows:

```
1    if T_beacon timer expired
2    begin
3        if SN_i in ACTIVE mode
4        begin
5            Calculate Load: B(i)
6            Compute: L
7            if B(i)>(1+δ)L    %Overloaded
8            begin
9                Reject new roaming STAs
10               Find best candidate: STA closest to (B(i) – L)
11               Disassociate candidate
12           end
13           else if B(i) < L    %Underloaded
14               Accept new and roaming STAs
15           else               %Balanced
16               Accept new STAs
17           end
18       end
19
20   if T_W timer expired
21   begin
22       Calculate U_BE
23       if SN_i has min(E_ACTIVE)
24       begin
```

-continued

```
25         if $\overline{U_{BE}}' < H_{factor} U_{BEmax}$
26         begin
27            Disassociate all STAs
28            Change to IDLE mode
29         end
30      end
31      else if $SN_i$ has max($E_{IDLE}$)
32      begin
33         if $\overline{U_{BE}} > U_{BEmax}$
34            Change to ACTIVE mode
35         end
36   end
37
38   if $T_{switch}$ timer expired and SN has min($E_{ACTIVE}$)
39   begin
40      if ($\Delta E > \Delta E_{max}$)
41         Wait for highest IDLEing SN to awake, then change
to IDLE mode
42   end
43
44   Transmit SN information to neighbors
```

2. Load Balancing and Awakenin/IDLEing Algorithm (LAS)

Determining the minimum number of SNs needed to provide service to a hotspot can be formulated as an optimization problem, subject to the constraint that each SN may only support a finite load. In the LAS algorithm, STAs are transferred only when necessary. The LAS method supports both BE and CO traffic, and is compatible with the IEEE 802.11e standard. However, because the Hybrid Coordinator has control over the CO period, the optimization problem exists mainly in the BE period.

The LAS algorithm is executed every $T_W$ seconds by each SN. A DISASSOCIATION_TOKEN (DT), which is passed from SN to SN in a round-robin fashion using broadcast messages, is used to grant to a SN the right to disassociate STAs. During each execution cycle, the SN that has possession of the DT may transfer STAs to the other SNs. The DT ensures that only one SN is disassociating STAs at any time, which avoids the situation where two or more SNs are simultaneously transferring STAs to each other. All SNs are aware of which SN has the DT. If the SN that is expecting to receive the DT next does not receive it within a certain time, then it may request the DT directly from the SN that last had possession of it. If there is no answer, the next SN may consider this an outage, and may take possession of the DT, and announce the other SNs that it has the DT.

As in the PLAS algorithm, all the ACTIVE SNs measure and communicate their fractional BE channel utilization $U_{BE}$ every $T_W$ to the other SNs. The IDLE SNs need only broadcast their battery-capacity levels, $E_i$. The main objective of each SN is to always operate below a threshold usage level, $U_{BEmax}$. This can be expressed as:

$$U_{BE}^{i'} \leq U_{BE\,max} \qquad (2)$$

where $U_{BE}^{i'}$ represents the target value for $U_{BE}^{i}$ after completion of the algorithm. To reduce its value of $U_{BE}^{i'}$ below $U_{BEmax}$, a SN may (1) transfer BE-only STAs, or (2) transfer any STA including STAs supporting CO traffic. It is preferable not to transfer STAs that are actively supporting CO traffic, which typically corresponds to realtime applications such as VoIP, or video streaming. In the LAS method, a first attempt is made to reduce $U_{BE}^{i}$ by transferring BE-only STAs. Only after this approach is insufficient are STAs that are actively supporting CO traffic transferred.

Step 1: Evaluating BE-only stations for transferal: Transferring STAs that are only using BE services is preferable because CO sessions are likely related to real-time applications, which suffer more from delays or an interruption in service. For simplicity, we'll assume the SN labeled "1", i.e., $SN_1$, has the DT. The required amount of load to be transferred by the SN with the DT is defined as:

$$\alpha = (U_{BE}^{1} - U_{BE\,max})T_{BE}^{1} \qquad (3)$$

$SN_1$ may also determine how much load may be transferred to neighboring ACTIVE $SN_j$ using the following formula:

$$\gamma = \sum_{j=1}^{N_{ACTIVE}} (U_{BE\,max} - U_{BE}^{j})T_{BE}^{j}, \forall\, j \neq 1 \qquad (4)$$

where if $U_{BEmax}$ is $<U_{BE}^{j}$ for the jth SN, the contribution of this SN to the summation is zero. If $\gamma > \alpha$, $SN_1$ may evaluate redistributing part of its load to its neighboring $SN_j$. $SN_1$ may calculate the maximum load that each ACTIVE SN can receive using the following formula for the capacity:

$$C(j) = (U_{BE\,max} - U_{BE}^{j})T_{BE}^{j}, \forall\, j \neq 1 \qquad (5)$$

$$\text{if } C(j) < 0 \Rightarrow C(j) = 0 \qquad (6)$$

$SN_1$ then selects from among its associated $STA_k$ the BE-only STA with the greatest $t_{BE}$ that can be handled by the SN with the largest capacity, C(j). If there is no SN available that can handle this STA, then the STA is considered non-transferable and is removed from the list of STAs that can be transferred. Otherwise, if an SN is found that can accommodate the STA, the STA is removed from the list and a STA-SN tuple corresponding to this pairing is recorded (for future disassociation). C(j) is reduced by $t_{BE}^{k}$. This process continues, until:

$$\sum t_{BE}^{k} > \alpha \qquad (7)$$

where $\alpha$ is given by Equation 3, or, until $SN_1$ has evaluated moving all its associated $STA_k$ without satisfying this inequality, in which case, $SN_1$ may perform Step 2, as outlined below.

Step 2: Evaluating any stations for transferal: If step 1 fails to alleviate the problem of overloading, $SN_1$ may then evaluate transferring STAs regardless of whether they are supporting CO sessions. In this second step, all STAs are treated equally. In this case, each time $SN_1$ transfers a STA, it may reduce its $U_{BE}$ either by reducing the load during the BE period, or by increasing $T_{BE}$ as $T_{CO}$ is reduced by $t_{CO}^{k}$ when the kth STA is disassociated:

$$U_{BE}' = \frac{U_{BE}T_{BE} - \pi}{T_{BE} + \varepsilon} \qquad (8)$$

where $\pi$ is the total time usage $t_{BE}^{k}$ on the BE period of the transferred STAs and $\varepsilon$ is their total time allocation $t_{CO}^{k}$ on the CO period. As in step 1, the objective is to make $U_{BE}^{i'} \leq U_{BE\,max}$. Using Equation 8, we can write:

$$\pi + \varepsilon U_{BE\,max} \geq (U_{BE}^{i} - U_{BE\,max})T_{BE}^{i}. \qquad (9)$$

Using this inequality, $SN_1$ calculates for each of its associated STAs:

$$v(k) = t_{BE}^k + t_{CO}^k U_{BE\,max}. \quad (10)$$

Using v(k), $SN_1$ can select which STAs to disassociate. As in Test 1, $SN_1$ evaluates moving STAs to the neighboring $SN_j$. It begins looking for the STA with the highest v(k) and searches through all of the ACTIVE SNj starting from the one with the highest available capacity, C, in descending order until it can find one that can support the STA demands without being overloaded. If a SN capable of handling this STA is found, a STA-SN tuple is created for this pair, C is updated for this SN, and the STA is removed from the list. Otherwise, the STA cannot be transferred and is removed from the list anyway. $SN_1$ continues picking the next remaining STA with the highest v(k) and evaluating transferring it to the SN with the greatest capacity that can accept it, until no more STAs may be moved.

Step 3: Waking a SN In the case where Step 1 and Step 2 together fail to reduce the load of $SN_1$ to an acceptable level, $SN_1$ may command a IDLE SN to wake. Preferably, the IDLE SN with the highest battery-capacity level will be selected to change to ACTIVE mode. Once this SN is ACTIVE, $SN_1$ transfers STAs to it according to the method outlined in Step 1, with one difference. Instead of reducing $U_{BE}$ below $U_{BEmax}$, it attempts to split the BE load between itself and the newly awakened SN.

Step 4: Load Balancing If $U_{BE} > U_{BEmax}$ and there is no other IDLE SN that can be switched into ACTIVE mode, $SN_1$ calculates the average BE utilization in the hotspot denoted $\overline{U_{BE}}$. Since a perfect load balancing is not feasible, $SN_1$ has to transfer STA only if $U_{BE}^i > (1+\eta)\overline{U_{BE}}$. A small tolerance, $\eta$, typically of about 5%, is allowed because perfect load balancing is not feasible. If so, $SN_1$ makes use of some of the procedures outlined in Step 1 and Step 2, but with the objective of obtaining:

$$U_{BE}^i \leq \overline{U_{BE}}. \quad (11)$$

Step 5: Evaluate changing to IDLE mode If at Step 1, $U_{BE} < U_{BEmax}$ (i.e. $SN_1$ is under-loaded at the start of the algorithm), then $SN_1$ may evaluate changing to IDLE mode. This step assesses the effect of transferring all of its STAs to neighboring $SN_j$. To do this it follows the method of Step 2, but the objective is to transfer all STAs. While transferring STAs, it is preferable to avoid overloading the neighboring $SN_j$ by pushing their load to $U_{BEmax}$. A buffer may be provided for the neighboring $SN_j$ through use of a lower maximum permissible resulting load, given by:

$$C^{j\prime} = C^j H, \quad (12)$$

where H is a buffer factor. This avoids the problem of a neighboring SN quickly becoming overloading and re-awakening $SN_1$, or another IDLE SN needlessly.

Step 6: Check Battery Capacity On each occasion when a SN has the DT, it compares its battery-capacity level with the battery-capacity level of all the other SNs. If it has the lowest battery-capacity level among the ACTIVE SNs and there exists a IDLE SN whose battery-capacity level exceeds its own by more than a threshold amount, $\Delta E_{max}$, then $SN_1$ will command the IDLE SN to switch to ACTIVE mode, it will transfer all its STAs to the now-ACTIVE SN, and $SN_1$ will itself switch to IDLE mode.

Step 7: Disassociating STAs At this point in the algorithm, if a list of STA-SN tuples has been created, then $SN_1$ will disassociate the corresponding STAS. $SN_1$ will then broadcast the tuple information to its neighboring $SN_j$. If a roaming STA tries to re-associate with the incorrect SN (i.e. a different SN from its pair in the tuple), its request will be rejected. The STA will keep attempting to associate until it finds its matched SN.

A pseudo-code description of the LAS algorithm follows:

```
1   SN₁ executes this algorithm
2   Create list of BE STAs: t_BE^k → s(k)
3   Create list of all STAs: t_BE^k + t_CO^k U_BEmax → v(k)
4   if T_W timer expired & SN₁ has the DT
5   begin
6       Calculate utilization: U_BE, U_CO
7       if U_BE > U_BEmax
8       begin
9           Compute: α = [U_BE^i − U_BEmax]T_BE^i
10          Create: [U_BEmax − U_BE^j]T_BE^j → C(j), ∀j_ACTIVE ≠ 1
11          Compute: γ = ΣC(j)
12          if α < γ,
13          begin
14              BinPacking (C(j), s(k), α) → Tuples(k, j)
15              if Tuples (k, j) ≠ Null
16                  α = 0
17          end
18          if α > 0 & α < γ
19          begin
20              BinPacking (C(j), v(k), α) → Tuples(k, j)
21              if Tuples(k, j) ≠ Null
22                  α = 0
23          end
24          if α > 0 & there is an IDLE SN
25          begin % Splitting the BE load
26              Command SN−h with max(E_IDLE) to awake
27              C(h) = C(i) = 0
28              α = 0
29              BinPacking (C(i):C(h), v(k), U_BE^i T_BE^i )
30          end
31          if α > 0
32          begin %over U_BEmax operation
33              Calculate U_BE
34              if U_BE^i > (1 + η)U_BE
35              begin
36                  α = U_BE − U_BE^i
37                  Create: [U_BE − U_BE^j]T_BE^j → C(j), ∀j_ACTIVE ≠ 1
38                  BinPacking (C(j), s(k), α) → Tuples(k, j)
39                  if Tuples(k, j) = Null
40                      BinPacking (C(j), v(k), α) → Tuples(k, j)
41              end
42          end
43      end
44      else if SN₁ is min(E_ACTIVE)
45      begin % Sleeping Case
46          α = U_BE^i T_BE^i + U_CO^i T_CO^i U_BEmax
47          Create: [U_BEmax H_factor−U_BE^j]T_BE^j → C(j), ∀j_ACTIVE ≠ 1
48          BinPacking (C(j), v(k), α) → Tuples(k, j)
49          if Tuples(k, j) ≠ Null
50              When STA transfer complete SN1 changes to IDLE mode
51      end
52  end
53  if T_switch timer expired & SN is max(E_IDLE) & DT = 1
54  begin
55      if ΔE > ΔE_max
56          Command SN−c with max(E_IDLE) to awake
57          Transfer all STAs to SN−c → Tuples(k, j)
58          When full STA transfer complete SN₁ changes to IDLE mode
59  end
60  if Tuples(k, j) ≠ Null
61      Disassociate STA−k | ∈ Tuples(k, j)
62  Transmit SN₁ information to neighbors including Tuples(k, j)
```

The following is a pseudo-code listing of the Bin Packing algorithm used in the LAS algorithm:

```
1   % Input Parameters
2   % Bins Vector → D
3   % Boxes Vector → X
```

```
4   % Objective → Target
5   Create list of X_k → List
6   while Target > 0 and Sizeof(List) > 0
7   begin
8       Find the biggest element on List: X_k
9       Find the emptiest bin: D_j
10      if X_k ≤ D_j
11      begin
12          D_j = D_j - X_k
13          Target = Target - X_k
14          Add (k,j) to Tuples(k,j)
15          Remove k from List
16      end
17      else
18          Remove k from List
19      end
20      if Target > 0
21          Tuples(k,j) = Null
22
23      Return Tuples(k,j)
```

Figure 7:
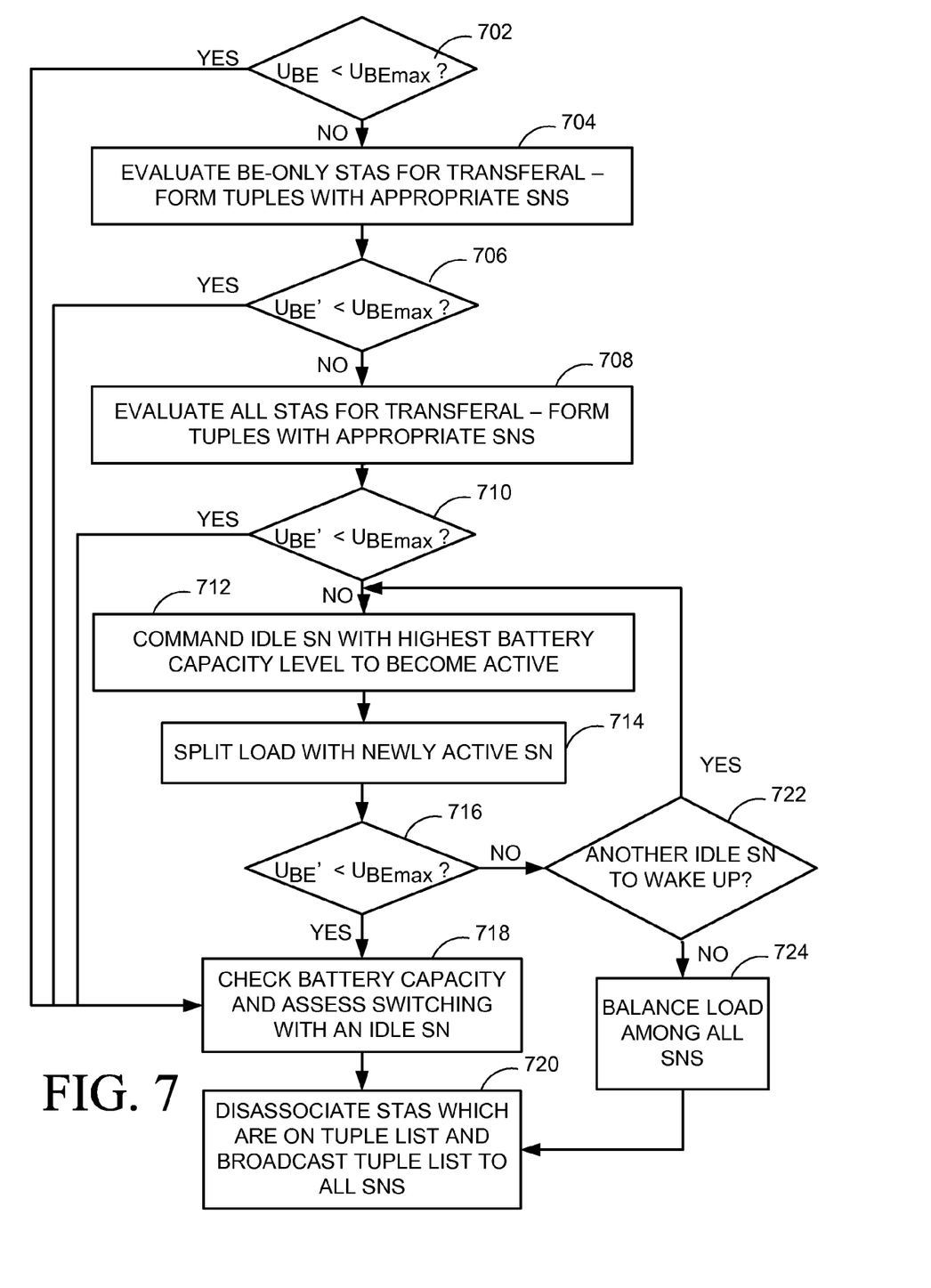
FIG. 7 is a flowchart of an exemplary power management method including load balancing, compatible with the WLAN system of FIG. 1.

FIG. 7 is a flowchart showing the LAS method, as implemented in a solar node such as SN 102. At 702, SN 102 calculates its own utilization, $U_{BE}$, and checks whether this is lower than the maximum allowable utilization. If its utilization is lower than the allowable limit, then at 718, it evaluates its own battery capacity reserve, and whether it should awaken another SN from IDLE mode, transfer all its STAs to the newly awakened SN, and switch itself into IDLE mode while recharging its battery. If, at 702, its utilization is higher than the allowed limit, it evaluates all the slave STAs that are not actively sending/receiving CO data to determine whether there are other SNs available with excess capacity that can support the load of these STAs. As a result of this evaluation, SN 102 maintains a list of STA-SN tuples that corresponds to matched pairs of STAs and SNs for later transferal.

After evaluating all the BE-only STAs, SN 102 checks at 706 whether the resulting utilization (after transferring the STAs on the list) would be less than the allowable maximum utilization. If SN 102 was able to reduce its load below the allowable level by transferring BE-only STAs, it will then go to step 718 and evaluate its battery capacity reserve. If unsuccessful, SN 102 will, at 708, evaluate all its slave STAs for potential transferal, regardless of whether they are actively supporting CO traffic. As in 704, the list of tuples will updated to include the additional STA/SN tuples that are identified at this step.

At 710, SN 102 will again check whether it was able to reduce its load below the allowable level. If successful, SN 102 will proceed to step 718. If not successful, SN 102 will, at 712, command the IDLE SN with the highest battery capacity level to become ACTIVE. At 714, it will then split its own load with the newly awakened SN.

At 716, it will again check whether it was able to reduce its load below the allowable level. If successful, SN 102 will proceed to step 718. If not successful, SN 102 will go to 722, where it will check whether there is another IDLE SN that is available to wake up and share its load. If there is no other IDLE SN available, it will, at 724, attempt to balance the load among all the ACTIVE SNs, despite the fact that the resulting utilizations of the SNs may be higher than the allowable maximum. The WLAN will operate above the utilization threshold.

After completing these steps, then at 720, SN 102 sends disassociation notifications to the STAs which are on its tuple list. SN 102 also broadcasts its tuple list to all the other SNs in the hotspot. When the newly disassociated STAs attempt to re-associate with another SN, the new SN will check the list to determine whether it should allow the STA to associate with it. In this way, all the STAs which have been disassociated by SN 102 will be associated to the SNs which have been assigned to them in the tuple list.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for managing power consumption in a wireless local area network having multiple access points with overlapping coverage, where modes of different power consumption are available to the access points, the method comprising:
    assessing whether the traffic load of the network can be adequately supported using fewer access points in an active mode;
    if the traffic load can be adequately supported using fewer access points in the active mode, redistributing the traffic load from certain active access points among the remaining access points in the active mode and switching the certain access points into a mode of lower power consumption than the active mode.

2. The method of claim 1, wherein redistributing the traffic load and switching the certain access points into the lower-power-consumption mode comprises:
    each of the certain access points independently determining to disassociate mobile stations to reduce its own load and to switch into the lower-power-consumption mode.

3. The method of claim 1, wherein redistributing the traffic load comprises using load balancing.

4. The method of claim 1, wherein assessing whether the traffic load can be adequately supported using a reduced number of access points in the active mode comprises:
    assessing the usage for each individual access point; and
    communicating the individual usages to all the access points in the network.

5. The method of claim 4, further comprising:
    calculating a mean value of the usages for all the access points in the network; and
    determining that the traffic load can be adequately supported if the mean value does not exceed a maximum allowable value.

6. The method of claim 4, wherein the usage is the usage during times reserved for best effort traffic.

7. The method of claim 6, further comprising:
    assessing the connection oriented usage for each individual access point; and
    communicating the individual connection oriented usages to all the access points in the network.

8. The method of claim 7, wherein redistributing the traffic load comprises:
    redistributing the traffic load by first transferring mobile stations that are supporting only best effort traffic from an overloaded access point to other access points that are in the active mode; and
    thereafter transferring mobile stations that are supporting both best effort traffic and connection oriented traffic from an overloaded access point to other access points that are in the active mode only if transferring the mobile stations that are supporting only best effort traffic did not redistribute the traffic load sufficiently.

9. The method of claim 1, wherein assessing whether the traffic load can be adequately supported using a reduced number of access points in the active mode comprises:
calculating the battery capacity level for each individual access point; and
communicating the individual battery capacity levels to all the access points in the network.

10. The method of claim 9, further comprising:
comparing the battery capacity levels to identify the access point in the active mode which has the lowest battery capacity level.

11. The method of claim 10, wherein the certain access points include the access point in the active mode which has the lowest battery capacity level.

12. A method for managing power consumption in a wireless local area network comprising multiple access points with overlapping coverage, where modes of different power consumption are available to the access points, the method comprising:
assessing whether the traffic load of the network is adequately supported by the current number of access points in an active mode;
if the traffic load is not adequately supported by the current number of access points in the active mode, switching to the active mode certain access points which are in a mode of lower power consumption than the active mode and redistributing the traffic load among the access points in the active mode including the certain access points.

13. The method of claim 12, wherein switching certain access points to the active mode comprises:
each of the certain access points independently determining to switch into the active mode.

14. The method of claim 12, wherein redistributing the traffic load comprises using load balancing.

15. The method of claim 12, wherein assessing whether the traffic load is adequately supported by the current number of access points in the active mode comprises:
assessing the usage for each individual access point; and
communicating the individual usages to all the access points in the network.

16. The method of claim 15, further comprising:
calculating a mean value of the usages for all the access points in the network; and
determining that the traffic load is not adequately supported if the mean value exceeds a maximum allowable value.

17. The method of claim 15, wherein the usage is the usage during times reserved for best effort traffic.

18. The method of claim 12, wherein assessing whether the traffic load is adequately supported by the current number of access points in the active mode comprises:
calculating the battery capacity level for each individual access point; and
communicating the individual battery capacity levels to all the access points in the network.

19. The method of claim 18, further comprising:
comparing the battery capacity levels to identify the access point in the lower-power-consumption mode which has the highest battery capacity level.

20. The method of claim 19, wherein the certain access points include the access point in the lower-power-consumption mode which has the highest battery capacity level.

* * * * *